US010099432B2

(12) United States Patent
Mizuta et al.

(10) Patent No.: US 10,099,432 B2
(45) Date of Patent: Oct. 16, 2018

(54) MANUFACTURING METHOD FOR FIBER-REINFORCED RESIN SHEET AND MANUFACTURING DEVICE THEREFOR

(75) Inventors: Kazuhiro Mizuta, Toyota (JP); Yuji Kageyama, Anjo (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 1252 days.

(21) Appl. No.: 14/237,762

(22) PCT Filed: Sep. 14, 2011

(86) PCT No.: PCT/JP2011/071003
§ 371 (c)(1),
(2), (4) Date: Feb. 7, 2014

(87) PCT Pub. No.: WO2013/038521
PCT Pub. Date: Mar. 21, 2013

(65) Prior Publication Data
US 2014/0175694 A1    Jun. 26, 2014

(51) Int. Cl.
*B29C 70/06*    (2006.01)
*B29C 70/50*    (2006.01)
(Continued)

(52) U.S. Cl.
CPC .............. *B29C 70/06* (2013.01); *B29B 11/16* (2013.01); *B29B 15/122* (2013.01);
(Continued)

(58) Field of Classification Search
CPC .................................................. B29C 70/504
See application file for complete search history.

(56) References Cited

U.S. PATENT DOCUMENTS

| 5,149,372 A * | 9/1992 | Ives ......................... B05C 3/18 |
| | | 118/407 |
| 6,896,647 B1 * | 5/2005 | Karger ................. D21G 1/0233 |
| | | 29/895.21 |
| 2005/0202205 A1 * | 9/2005 | Petersen ............. A61F 13/5611 |
| | | 428/100 |

FOREIGN PATENT DOCUMENTS

| JP | 5-104647 A | 4/1993 |
| JP | 7-16936 A | 1/1995 |

(Continued)

*Primary Examiner* — Matthew J Daniels
*Assistant Examiner* — Kimberly A Stewart
(74) *Attorney, Agent, or Firm* — Sughrue Mion, PLLC

(57) ABSTRACT

Provided is a manufacturing method for a fiber-reinforced resin sheet, the method being able to favorably impregnate a reinforcing-fiber base material with a thermoplastic resin. A fiber-reinforced resin sheet S is manufactured by introducing a reinforcing-fiber base material F in sheet form and a thermoplastic resin P into the gap between a pair of impregnating rolls 10A, 10B and impregnating the reinforcing-fiber base material F with the thermoplastic resin P while rotating the pair of impregnating rolls 10A, 10B. The surface of each of the pair of impregnating rolls 10A, 10B has formed thereon a resin holding layer 12 that elastically deforms along the thickness direction thereof when the impregnating rolls are pressed against each other and holds the molten thermoplastic resin P therein so as to be able to discharge the thermoplastic resin P upon pressing of the impregnating rolls against each other. Upon pressing of the impregnating rolls against each other, the reinforcing-fiber base material F is impregnated with the thermoplastic resin P while the resin holding layer 12 is elastically deformed.

3 Claims, 5 Drawing Sheets
(1 of 5 Drawing Sheet(s) Filed in Color)

(51) Int. Cl.
*B29B 15/12* (2006.01)
*B29B 11/16* (2006.01)
B29C 47/00 (2006.01)
B29C 47/32 (2006.01)
B29K 101/12 (2006.01)
B29K 105/08 (2006.01)

(52) U.S. Cl.
CPC .......... *B29C 70/504* (2013.01); *B29C 47/004* (2013.01); *B29C 47/0021* (2013.01); *B29C 47/32* (2013.01); *B29K 2101/12* (2013.01); *B29K 2105/0872* (2013.01)

(56) References Cited

FOREIGN PATENT DOCUMENTS

| | | |
|---|---|---|
| JP | 11-235747 A | 8/1999 |
| JP | 2012-110935 A | 6/2012 |

* cited by examiner

(a)

(b)

(a)

(b)

MANUFACTURING METHOD FOR FIBER-REINFORCED RESIN SHEET AND MANUFACTURING DEVICE THEREFOR

CROSS REFERENCE TO RELATED APPLICATIONS

This application is a National Stage of International Application No. PCT/JP2011/071003 filed Sep. 14, 2011, the contents of all of which are incorporated herein by reference in their entirety.

TECHNICAL FIELD

The present invention relates to a manufacturing device for a fiber-reinforced resin sheet, the device being able to introduce a reinforcing-fiber base material in sheet form and a thermoplastic resin into the gap between a pair of rolls, and favorably impregnate the reinforcing-fiber base material with the thermoplastic resin that is melted, and a manufacturing method for a fiber-reinforced resin sheet.

BACKGROUND ART

Conventionally, fiber-reinforced composite materials (i.e., fiber-reinforced resin materials), which are obtained by impregnating reinforcing fibers with a matrix resin such as a thermosetting resin or a thermoplastic resin, and are lighter and more elastic than metal materials, and are also stronger than when only a resin material is used, are drawing attention for application to members of vehicles and the like.

In order to utilize the inherent characteristics of reinforcing fibers, i.e., high strength and high elasticity against tension, using a sheet, which is obtained by using reinforcing fibers such as continuous fibers as a reinforcing-fiber base material, and impregnating or semi-impregnating the reinforcing-fiber base material with a matrix resin in advance, as a prepreg sheet (i.e., a fiber-reinforced resin sheet) is common.

Meanwhile, a fiber-reinforced resin sheet that is impregnated with a thermoplastic resin as a matrix resin is drawing attention as a material with added values because it is superior to a sheet impregnated with a thermosetting resin in terms of toughness, short-time moldability, recyclability, and the like due to the characteristics of the thermoplastic resin.

However, thermoplastic resins typically have higher viscosity than thermosetting resins, and in order to mold a thermoplastic resin, the resin should be heated to a high temperature. Thus, it would be not easy even to mold a thermoplastic resin into a film with uniform thickness. As such a technique, for example, there is known a technique of molding a thermoplastic resin into a film form by introducing a sheet-form molten resin, which has been extruded using an extruder, into the gap between a main roll made of metal and a press roll made of metal, and causing the thin outer cylinder of the press roll to deform along the shape of the circumferential surface of the main roll, and pressing the resin between the rolls while cooling the resin (for example, see Patent Literature 1).

As described above, it would be not easy even to mold a thermoplastic resin into a film form. Further, manufacturing a fiber-reinforced resin sheet containing a thermoplastic resin as a matrix resin is a more difficult technique than using a thermosetting resin. Thus, various researches have been conducted for such techniques.

For example, as a method for manufacturing a fiber-reinforced resin sheet by impregnating a reinforcing-fiber base material with a thermoplastic resin, there have been proposed a method of pressing a softened thermoplastic resin film against a reinforcing-fiber base material, using a pair of metal press rolls, thereby impregnating the reinforcing-fiber base material with the thermoplastic resin (for example, see Patent Literature 2), and a method of cutting reinforcing fibers into given lengths, mixing the reinforcing fibers with resin powder, and melting the thermoplastic resin in the gaps between a plurality of pairs of thermal pressure rolls, thereby impregnating spaces between the reinforcing fibers with the molten thermoplastic resin (for example, see Patent Literature 3).

CITATION LIST

Patent Literature

Patent Literature 1: JP H11-235747 A
Patent Literature 2: JP H7-016936 A
Patent Literature 3: JP H5-104647 A

SUMMARY OF INVENTION

Technical Problem

By the way, it has been known that in order to impregnate reinforcing fiber bundles with a resin, if the reinforcing fiber bundles are thin, the molding pressure (i.e., pressure applied during impregnation) should be high, and further, if the melt viscosity of the resin is low, the time taken for the reinforcing fiber bundles to be impregnated with the thermoplastic resin is short (i.e., the reinforcing-fiber base material will be easily impregnated with the thermoplastic resin).

However, when a thermoplastic resin is used, since the thermoplastic resin has a higher molecular weight than a thermosetting resin and thus has high melt viscosity, spaces between the reinforcing fibers will not be easily impregnated with the thermoplastic resin using capillarity, unlike with the thermosetting resin.

Thus, when impregnation with a molten thermoplastic resin is conducted using the device shown in Patent Literature 2 or 3, only linear pressure would be able to act upon the thermoplastic resin and the reinforcing-fiber base material between the pair of rolls. Accordingly, the time during which the pressure acts upon the thermoplastic resin and the reinforcing-fiber base material is instantaneous, and thus it may be impossible for the reinforcing-fiber base material to be sufficiently impregnated with the thermoplastic resin. Further, when linear pressure is made to act, the pressure applied is likely to be non-uniform in the width direction of the rolls. Thus, the reinforcing-fiber base material may not be uniformly impregnated with the thermoplastic resin, and thus voids may be generated.

In view of the foregoing, using a main roll is made of metal and a press roll made of metal as in Patent Literature 1 seems to be preferable. However, when pressure that acts upon the reinforcing-fiber base material between the pair of rolls is high, there may be cases where the necessary amount of the thermoplastic resin may not enter into the gap between the rolls during impregnation, and thus the reinforcing-fiber base material may not be sufficiently impregnated with the thermoplastic resin.

The present invention has been made in view of the foregoing problems. It is an object of the present invention to provide a manufacturing method for a fiber-reinforced resin sheet, the method being able to favorably impregnate a reinforcing-fiber base material with a molten thermoplastic resin, and a manufacturing device therefor.

In order to solve the aforementioned problems, a manufacturing method for a fiber-reinforced resin sheet in accordance with the present invention is a method for manufacturing a fiber-reinforced resin sheet by introducing a reinforcing-fiber base material in sheet form and a thermoplastic resin into a gap between a pair of impregnating rolls, and impregnating the reinforcing-fiber base material with the thermoplastic resin that is melted while rotating the pair of impregnating rolls. A surface of at least one of the pair of impregnating rolls has a resin holding layer formed thereon, the resin holding layer being adapted to elastically deform in the thickness direction thereof when the pair of impregnating rolls are pressed against each other, and hold the molten thermoplastic resin therein so as to be able to discharge the molten thermoplastic resin upon pressing of the pair of impregnating rolls against each other. Upon pressing of the pair of impregnating rolls against each other, the reinforcing-fiber base material is impregnated with the thermoplastic resin while at least the resin holding layer is elastically deformed.

According to the present invention, an impregnating roll having a resin holding layer formed thereon is used for the surface of at least one of the pair of impregnating rolls, whereby a molten thermoplastic resin can be held in the resin holding layer. Since the resin holding layer elastically deforms in the thickness direction thereof upon pressing of the pair of impregnating rolls against each other, it is possible to, upon pressing of the pair of impregnating rolls against each other, discharge the thermoplastic resin held in the resin holding layer to the gap between the pair of rolls from the pressed portion of the resin holding layer.

At this time, the surface of one impregnating roll having the resin holding layer formed thereon deforms along the shape of the surface of the other impregnating roll due to the elastic deformation of the resin holding layer. Accordingly, it is possible to allow surface pressure to act upon the thermoplastic resin and the reinforcing-fiber base material between the rolls in a state in which the molten thermoplastic resin is discharged from the resin holding layer to the gap between the pair of rolls.

As described above, the pressure that acts upon the reinforcing-fiber base material and the thermoplastic resin is the surface pressure, unlike the linear pressure that would act when a conventional single rigid roll is used. Accordingly, the reinforcing-fiber base material can be impregnated with the thermoplastic resin uniformly and stably, without excessive pressure acting upon the reinforcing-fiber base material. Consequently, a fiber-reinforced resin sheet with uniform thickness and without step-like streaks in the width direction can be obtained.

In addition, it is also possible to allow surface pressure to act between the pair of impregnating rolls while rotating the impregnating rolls, and supply a thermoplastic resin discharged from the deformed portion of the resin holding layer to a portion of the reinforcing-fiber base material upon which the surface pressure has acted. Accordingly, it is possible to secure a longer impregnation time than is conventional, and supply an optimal amount of thermoplastic resin to spaces between the fibers of the reinforcing-fiber base material while favorably removing air existing between the fibers during impregnation.

Further, the portion of the resin holding layer, which has elastically deformed upon pressing of the impregnating rolls against each other (i.e., a contact portion between the impregnating rolls), restores its original state with the rotation of the impregnating rolls. Accordingly, it is possible to supply the molten thermoplastic resin to spaces in the restored resin holding layer, and allow the resin holding layer to hold the thermoplastic resin therein again. Consequently, the reinforcing-fiber base material in sheet form and the thermoplastic resin can be introduced into the gap between the pair of impregnating rolls, and the reinforcing-fiber base material can be continuously impregnated (supplied) with the molten thermoplastic resin.

In particular, when a resin holding layer is provided on each impregnating roll, it is possible to, by relatively pressing the pair of impregnating rolls against each other, deform opposite circumferential surfaces of the impregnating rolls into a planar form, with surface pressure made to act upon the thermoplastic resin and the reinforcing-fiber base material between the impregnating rolls. Accordingly, uniform stress can be made to act upon opposite sides of the reinforcing-fiber base material, and thus, a uniform fiber-reinforced resin sheet with uniform thickness can be obtained.

Herein, the structure and material of the aforementioned resin holding layer are not particularly limited as long as the following three conditions are satisfied during manufacture of the fiber-reinforced resin sheet: (1) the resin holding layer elastically deforms when the pair of impregnating rolls are pressed against each other, (2) the resin holding layer can hold a molten thermoplastic resin therein, and (3) the held, molten thermoplastic resin can be discharged to the gap between the rolls from the elastically deformed portion upon pressing of the pair of impregnating rolls against each other.

For example, as the structure of the resin holding layer, it is possible to use a structure in which a plurality of inner spaces are formed that can allow a molten thermoplastic resin to infiltrate into the inside of the layer from the outside thereof, and is able to discharge the molten resin from the inside of the layer to the outside thereof upon pressing of the pair of impregnating rolls against each other. Such inner spaces communicate with the surface of the roll (i.e., the surface of the resin holding layer). In order to obtain a resin holding layer with such a structure, the resin holding layer is desirably formed of a fiber material, a foamed material, or a mesh stacked structure, for example. In addition, the material of the resin holding layer may be a material that does not melt with respect to the molten thermoplastic resin. For example, resin, metal, or the like can be used.

However, as a more preferable configuration, a metal fiber material or a metal foamed material is used for the resin holding layer. According to such a configuration, the resin holding layer is made of metal. Thus, the resin holding layer has higher thermal conductivity than resin, and thus, the thermoplastic resin held in the resin holding layer can be efficiently heated using a heating device or the like. Further, using a fiber material, a foamed material, or the like for the resin holding layer can easily form therein spaces for holding the molten thermoplastic resin.

Herein, the term "pair of impregnating rolls" as referred to in the present invention means rolls for introducing a reinforcing-fiber base material and a thermoplastic resin into the gap between the rolls, and impregnating the reinforcing-fiber base material with the thermoplastic resin that is melted, and thus allowing such impregnation. As long as such conditions are satisfied, the arrangement of the impregnating rolls and the method for supplying a thermoplastic resin to be supplied to the rolls are not particularly limited.

However, as a more preferable configuration, the pair of impregnating rolls are arranged side by side in the horizontal direction, and the molten thermoplastic resin is supplied to the gap between the pair of impregnating rolls so that a resin pool of the molten thermoplastic resin is generated above the pair of impregnating rolls.

According to such a configuration, a rein pool of the molten thermoplastic rein is formed above the pair of impregnating rolls that are arranged side by side in the horizontal direction. Thus, the molten thermoplastic resin from the resin pool can be stably supplied to the gap between the pair of impregnating rolls.

Further, the heating method is not particularly limited as long as the thermoplastic resin is in a molten state during impregnation with the thermoplastic resin. However, as a more preferable configuration, the resin holding layer is heated to a temperature that is greater than the melting point of the thermoplastic resin. According to such a configuration, as the resin holding layer is heated to a temperature that is greater than the melting point of the thermoplastic resin, it is possible to not only maintain the molten state of the thermoplastic resin held in the resin holding layer but also suppress an increase in viscosity due to heat dissipation from the supplied thermoplastic resin.

As another configuration, it is also possible to allow the resin holding layer to hold the molten thermoplastic resin therein by heating the pair of impregnating rolls and supplying a molten thermoplastic resin to the circumferential surfaces of the impregnating rolls each having the resin holding layer formed thereon, thereby infiltrating the supplied thermoplastic resin into the resin holding layer.

Further, it is also possible to wind the reinforcing-fiber base material around one of the pair of impregnating rolls and supply the thermoplastic resin to the other impregnating roll (i.e., a roll having no reinforcing-fiber base material wound around it). According to such a configuration, the reinforcing-fiber base material wound around the roll is heated by the heat of the roll, whereby the reinforcing-fiber base material can be impregnated with the thermoplastic resin using the heat of the heated roll. It should be noted that when the impregnating roll is to be heated, the surface of the roll may be heated using an infrared heater, for example, or a heated medium may be circulated through the inside of the impregnating roll.

The present application also discloses, as the present invention, a manufacturing device for favorably implementing the manufacturing method in accordance with the present invention. A manufacturing device for a fiber-reinforced resin sheet in accordance with the present invention is a device that is configured to introduce a reinforcing-fiber base material in sheet form and a thermoplastic resin into a gap between a pair of impregnating rolls, and impregnating the reinforcing-fiber base material with the thermoplastic resin that is melted while rotating the pair of impregnating rolls, and the device includes a reinforcing-fiber supply portion that supplies the reinforcing-fiber base material to be introduced into the gap between the pair of impregnating rolls; a resin supply portion that supplies the thermoplastic resin to be introduced into the gap between the pair of impregnating rolls; and a pressing portion that presses the pair of impregnating rolls against each other. A surface of at least one of the pair of impregnating rolls has a resin holding layer formed thereon, the resin holding layer being adapted to elastically deform in the thickness direction thereof when the pair of impregnating rolls are pressed against each other, and hold the molten thermoplastic resin so as to be able to discharge the molten thermoplastic resin upon pressing of the pair of impregnating rolls against each other.

According to the present invention, a surface of at least one of the pair of impregnating rolls has a resin holding layer formed thereon. Accordingly, the resin holding layer elastically deforms in the thickness direction thereof when the pair of impregnating rolls are pressed against each other, and thus is able to discharge the thermoplastic resin held in the resin holding layer to the gap between the pair of impregnating rolls from the pressed portion of the resin holding layer.

At this time, the surface of one impregnating roll having the resin holding layer formed thereon deforms along the shape of the surface of the other impregnating roll upon elastic deformation of the resin holding layer. According to such deformation, surface pressure can be made to act upon the thermoplastic resin and the reinforcing-fiber base material between the pair of rolls in a state in which the molten thermoplastic resin is discharged to the gap between the pair of rolls from the resin holding layer. Accordingly, the reinforcing-fiber base material can be impregnated with the thermoplastic resin uniformly and stably, and thus, a fiber-reinforced resin sheet with uniform thickness and without step-like streaks in the width direction can be obtained.

Further, a portion of the resin holding layer, which has elastically deformed upon pressing of the impregnating rolls against each other (i.e., a contact portion between the impregnating rolls), restores its original state with the rotation of the impregnating rolls. Accordingly, it is possible to supply the molten thermoplastic resin to spaces in the restored resin holding layer, and allow the resin holding layer to hold the thermoplastic resin therein again.

As a more preferable configuration, the resin holding layer includes a metal fiber material or a metal foamed material. According to such a configuration, the resin holding layer is made of metal. Thus, the resin holding layer has higher thermal conductivity than resin, and can efficiently heat the thermoplastic resin held in the resin holding layer using a heating device or the like. Further, using a fiber material, a foamed material, or the like for the resin holding layer can easily form therein spaces for holding the molten thermoplastic resin.

As a further preferable configuration, the impregnating roll is provided with a heating portion for heating the resin holding layer to a temperature that is greater than the melting point of the thermoplastic resin held in the resin holding layer.

According to such a configuration, the resin holding layer is heated to a temperature that is greater than the melting point of the thermoplastic resin using heat from the heating portion. Thus, it is possible to not only maintain the molten state of the thermoplastic resin held in the resin holding layer but also suppress an increase in viscosity due to heat dissipation from the supplied thermoplastic resin.

Advantageous Effects of Invention

According to the present invention, a reinforcing-fiber base material can be favorably impregnated with a thermoplastic resin.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 3A is a view illustrating a state before the pair of impregnating rolls are pressed by a pressing portion, and FIG. 3B is a view illustrating a state in which the pair of impregnating rolls are pressed by the pressing portion.

FIG. 8A is an enlarged view of a cross-section photograph in accordance with an example, and FIG. 8B is an enlarged view of a resin photograph in accordance with a comparative example.

DESCRIPTION OF EMBODIMENTS

Hereinafter, embodiments of a manufacturing device that can favorably implement a manufacturing method for a fiber-reinforced resin sheet in accordance with the present invention will be described with reference to the drawings.

Figure 1:
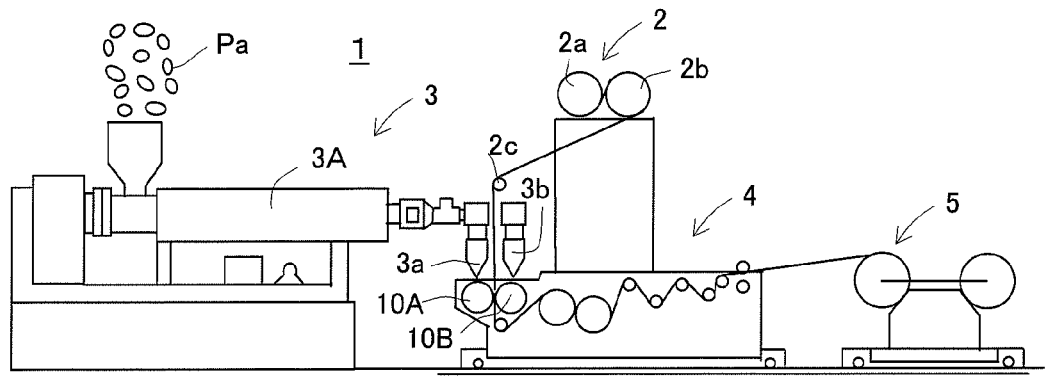
FIG. 1 is a schematic conceptual view of a manufacturing device for a fiber-reinforced resin sheet in accordance with an embodiment of the present invention.
Figure 2:
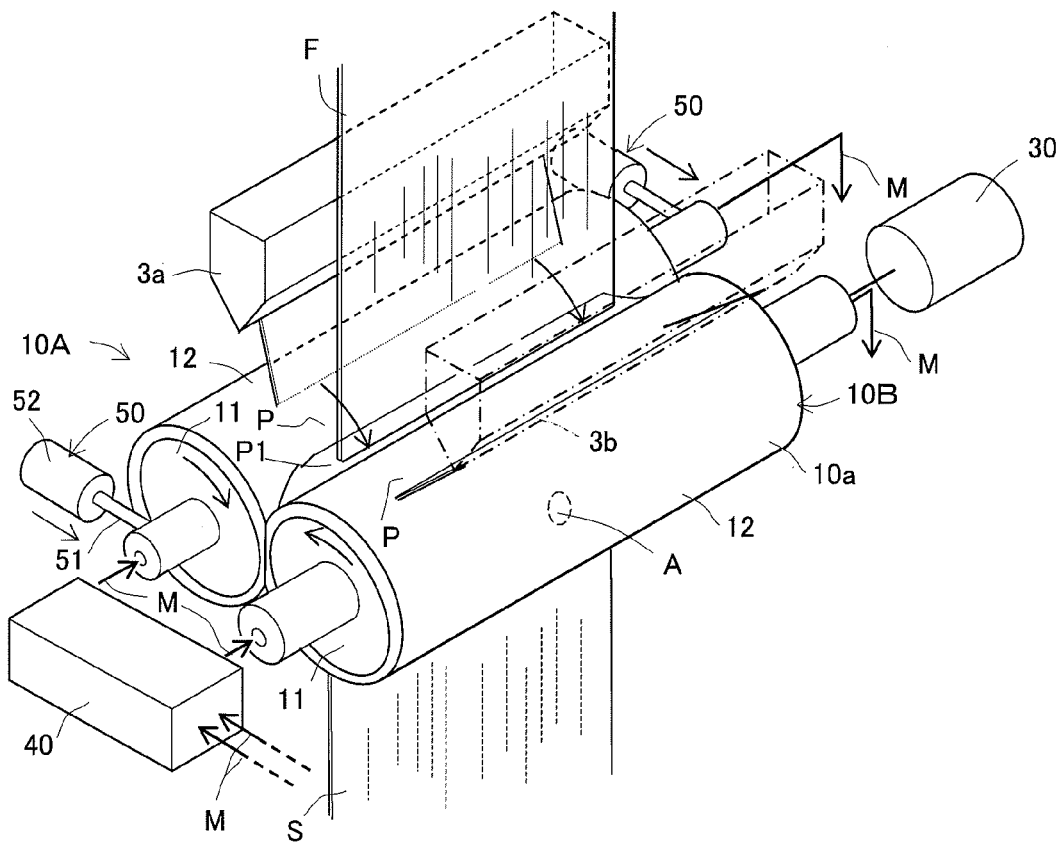
FIG. 2 is a schematic perspective view of a resin impregnating portion of the manufacturing device for a fiber-reinforced resin sheet shown in FIG. 1.

FIG. 1 is a schematic conceptual view of a manufacturing device for a fiber-reinforced resin sheet in accordance with the present invention. FIG. 2 is a schematic perspective view of a resin impregnating portion of the manufacturing device for a fiber-reinforced resin sheet shown in FIG. 1.

Figure 3:
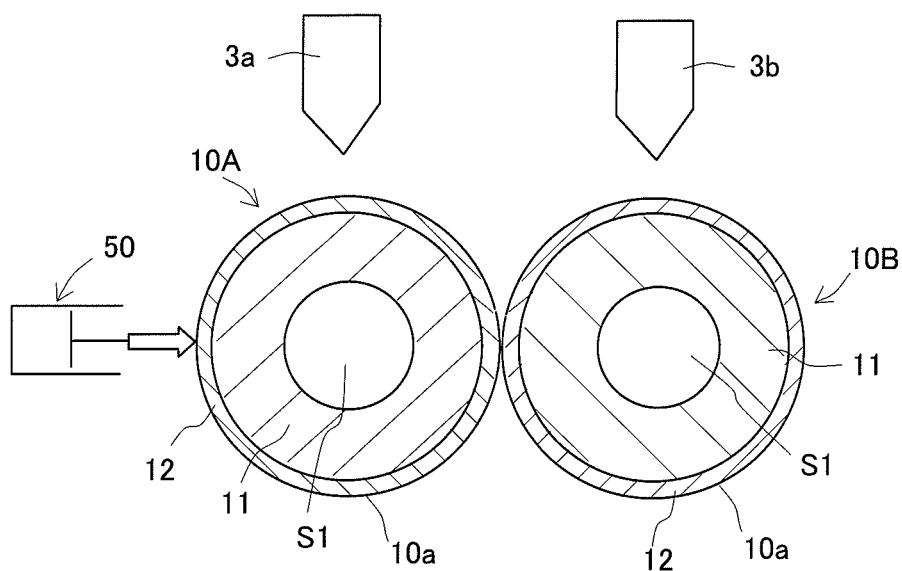
FIG. 3 are schematic conceptual views illustrating the pressed state of a pair of impregnating rolls of the manufacturing device for a fiber-reinforced resin sheet shown in FIG. 1; specifically.
Figure 3:
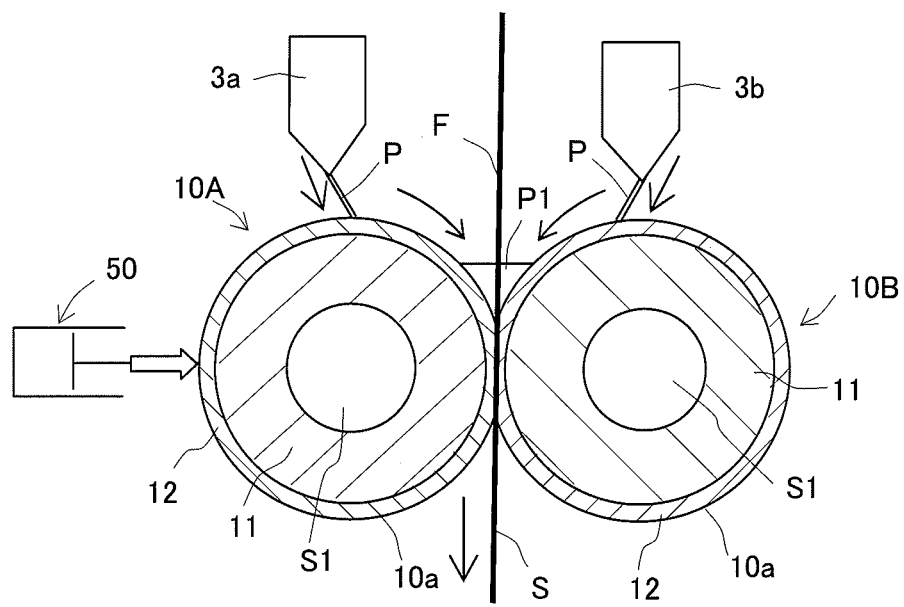

FIG. 3 are schematic conceptual views illustrating the pressed state of a pair of impregnating rolls of the manufacturing device for a fiber-reinforced resin sheet shown in FIG. 1; specifically, FIG. 3A is a view illustrating a state before the pair of impregnating rolls are pressed by a pressing portion, and FIG. 3B is a view illustrating a state in which the pair of impregnating rolls are pressed by the pressing portion.

Figure 4:
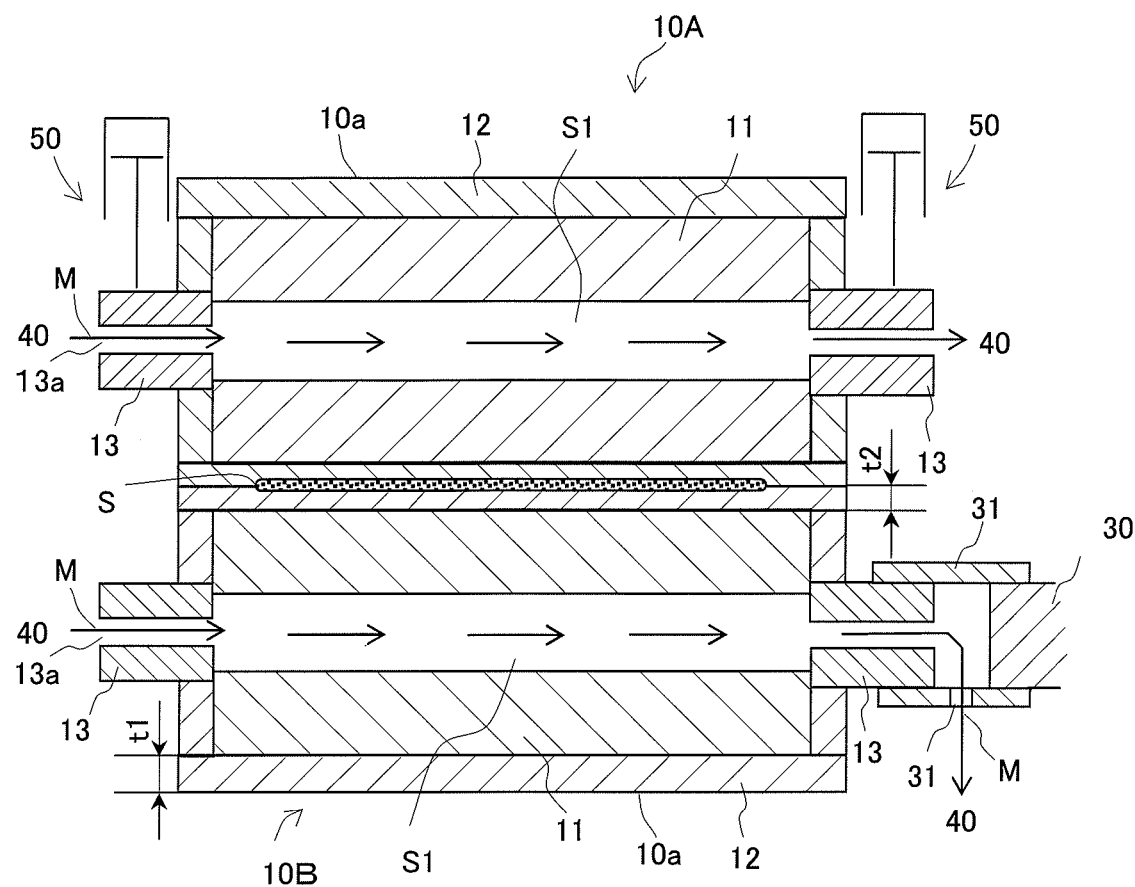
FIG. 4 is a schematic cross-sectional view in the horizontal direction that includes the rotation axes of the pair of impregnating rolls shown in FIG. 2.
Figure 5:
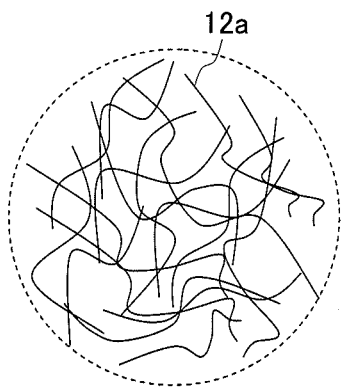
FIG. 5 is an enlarged view of a portion A (the surface of the resin impregnating portion) shown in FIG. 2.

FIG. 4 is a schematic cross-sectional view in the horizontal direction that includes the rotation axes of the pair of impregnating rolls shown in FIG. 2, and FIG. 5 is an enlarged view of a portion A (the surface of the resin impregnating portion) shown in FIG. 2.

A manufacturing device 1 for a fiber-reinforced resin sheet in accordance with this embodiment is a device for manufacturing a fiber-reinforced resin sheet. The manufacturing device 1 is a device intended to manufacture a fiber-reinforced resin sheet S by introducing a reinforcing-fiber base material F in sheet form and a thermoplastic resin P into the gap between a pair of impregnating rolls 10A, 10B described below, and impregnating the reinforcing-fiber base material F with the thermoplastic resin P while rotating the pair of impregnating rolls 10A, 10B.

As shown in FIG. 1, the manufacturing device 1 in accordance with this embodiment includes a reinforcing-fiber supply portion 2 that supplies the reinforcing-fiber base material F to be introduced into the gap between the pair of impregnating rolls 10A, 10B of a resin impregnating portion 4 described below, and a resin supply portion 3 that supplies the thermoplastic resin P to be introduced into the gap between the pair of impregnating rolls.

The reinforcing-fiber supply portion 2 is adapted to supply the reinforcing-fiber base material F in which continuous fibers are aligned in one direction in sheet form. The reinforcing-fiber base material F that is not supplied yet is a wound-up body 2a that is wound up in coil form. The reinforcing-fiber supply portion 2 has transfer rolls 2b, 2c arranged therein so as to allow the reinforcing-fiber base material F in sheet form, which has been unwound from the wound-up body 2a, to be introduced into the gap between the impregnating rolls 10A, 10B described below.

Meanwhile, the resin supply portion 3 includes a biaxial extrusion molding device 3A. The biaxial extrusion molding device 3A is a device that melts a thermoplastic resin pellet Pa at a temperature that is greater than or equal to the softening point thereof, and continuously molds the molten thermoplastic resin P into a sheet form via a die (i.e., a nozzle) 3a that is a resin discharging port. The die 3a is arranged above one impregnating roll 10A. The die 3a has a plurality of holes formed therein at regular intervals in the width direction. The molten thermoplastic resin is extruded via the plurality of holes, whereby the thermoplastic resin is continuously extruded in sheet form.

Likewise, a die 3b is also arranged above the other impregnating roll 10B. A molten thermoplastic resin is extruded via the die 3b using a biaxial extrusion molding device (not shown) as with the biaxial extrusion molding device 3A. Accordingly, the thermoplastic resin is continuously molded into a sheet form. Although the biaxial extrusion molding devices are individually connected to the respective dies 3a (3b) herein, it is also possible to, if the molten thermoplastic resin P can be supplied to each of the impregnating rolls 10A, 10B, allow the molten thermoplastic resin to flow into each of the dies 3a (3b) from a single biaxial extrusion molding device.

Each of the dies 3a (3b) of the resin supply portion 3 is arranged such that, as shown in FIGS. 2 and 3A, the thermoplastic resin P is supplied toward the circumferential surface 10a of each of the impregnating rolls 10A (10B) at a position above each impregnating roll. It should be noted that each circumferential surface 10a to which the thermoplastic resin P is supplied forms a part of a resin holding layer 12 described below. The supplied thermoplastic resin P infiltrates (i.e., flows) into the resin holding layers 12 via the circumferential surfaces 10a, 10a.

As described above, the thermoplastic resin P supplied to the circumferential surfaces 10a and 10a of the impregnating rolls 10A, 10B impregnates the reinforcing-fiber base material F at the resin impregnating portion 4. Herein, the resin impregnating portion 4 herein has, as described above, a pair of rolls 10A, 10B to impregnate the reinforcing-fiber base material F with the thermoplastic resin P. Specifically, the pair of impregnating rolls 10A, 10B include one impregnating roll 10A and the other impregnating roll 10B with the same structure, and such rolls are arranged side by side in the horizontal direction.

As shown in FIG. 4, the pair of impregnating rolls 10A, 10B are rigid rolls each obtained by covering the circumferential surface of a core material 11 made of metal, such as steel or aluminum, with the resin holding layer 12. In addition, each of the impregnating rolls 10A (10B) has a cylindrical space S1 formed therein. In the cylindrical space S1, a heated medium M (e.g., water) is introduced from a heating portion 40 via a medium inlet 13a formed in a shaft 13. In addition, the cylindrical space S1 is connected to the heating portion 40 so as to circulate the medium M discharged through the inside of the impregnating roll 10. Accordingly, the circumferential surface 10a of each of the impregnating rolls 10A (10B) can be constantly heated.

One impregnating roll 10A is connected to a pair of pressing portions 50, 50 so that one impregnating roll 10A functions as a roll to be pressed against the other impregnating roll B (so that the pair of impregnating rolls 10A, 10B are pressed against each other). Specifically, each pressing portion 50 includes a piston 51 and a cylinder 52 that are connected to the shaft 13 on each side of the impregnating roll 10A. As long as pressing that is described below can be conducted, operating pressure to effect the pressing may be either pneumatic pressure or hydraulic pressure.

The other impregnating roll 10B is rotatably fixed, and is connected to a motor 30 via a coupling 31. Accordingly, the pair of impregnating rolls 10A, 10B can rotate in the pressed state with the pressure acting upon the one impregnating roll A by the pressing portions 50 and with the rotation of the other impregnating roll 10B effected by the motor 30.

Herein, the resin holding layer 12 formed on the surface of each of the impregnating rolls 10A (10B) is formed such that it elastically deforms in the thickness direction thereof, from thickness t1 to t2 (where t1>t2), when the pair of impregnating rolls are pressed against each other as shown in FIG. 4. Further, each resin holding layer 12 is formed such that the resin holding layer 12 holds the molten thermoplastic resin P therein so as to be able to discharge the molten thermoplastic resin P to the gap between the rolls upon pressing of the rolls against each other.

Specifically, as shown in FIG. 5, the resin holding layer 12 contains a plurality of fiber materials 12a made of metal (e.g., iron or aluminum), and has a plurality of voids (spaces) formed therein that allow the molten thermoplastic resin P to be held in the resin holding layer 12. The voids communicate with the outside of each impregnating roll 10A (10B) via the circumferential surface 10a of the roll.

Herein, as more preferable conditions of the resin holding layer 12, a portion where the impregnating rolls are not pressed against each other (i.e., a portion where there is no load acting thereon) has a plurality of voids formed therein so as to allow the molten thermoplastic resin P to infiltrate into the layer from the surface thereof and thus allow the molten thermoplastic resin P to be held therein. Meanwhile, when the impregnating rolls are pressed against each other, it is desirable that the held molten thermoplastic resin P be discharged from the resin holding layer 12, and the bulk density of the resin holding layer 12 in the compressed state be greater than that of the supplied reinforcing-fiber base material F (i.e., the reinforcing-fiber base material have higher occupancy of voids) so that the reinforcing-fiber base material F can be easily impregnated with the molten thermoplastic rein P.

Further, the material, shape, and amount of the fiber materials 12a are selected so that when the impregnating rolls are pressed against each other, the fiber materials 12a compressed in the pressed portion will elastically deform, and after the pressure acting upon the impregnating rolls is removed, the fiber materials 12a will restore their original shape.

Further, the aforementioned heating portion 40 heats the medium M inside so that the roll surface (specifically, the resin holding layer 12) is heated to a temperature that is greater than or equal to the softening temperature (i.e., the melting point) of the thermoplastic resin P. The heated medium M is pumped to the impregnating rolls 10A, 10B using devices such as pumps so that both the impregnating rolls 10A, 10B (specifically, the resin holding layers 12) are heated. Accordingly, on the impregnating rolls 10A, 10B, it is possible to suppress an increase in viscosity of the thermoplastic resin P held in the resin holding layers 12, and consequently allow the reinforcing-fiber base material F to be impregnated with the thermoplastic resin P more easily.

Further, a plurality of transfer rolls are arranged further downstream of the impregnating rolls 10A, 10B of the resin impregnating portion 4 (see FIG. 1), and the device 1 also has arranged therein a wind-up portion 5 for further winding up the fiber-reinforced resin sheet obtained with the resin impregnating portion 4. Alternatively, it is also possible to further arrange a pair of heating rolls (i.e., smoother rolls) downstream of the impregnating rolls 10A, 10B, and transfer the fiber-reinforced resin sheet S to the gap between the heating rolls while applying pressure thereto, so as to smooth the surface of the fiber-reinforced resin sheet S.

A manufacturing method for the fiber-reinforced resin sheet S, which uses the thus configured manufacturing device, is described below. First, as the reinforcing-fiber base material F, a reinforcing-fiber base material, which has been obtained by aligning continuous fibers in one direction and winding them in coil form, is prepared. Herein, a base material obtained by aligning continuous fibers in one direction is used as the reinforcing-fiber base material F. However, it is also possible to use continuous fibers that are not aligned, or fibers in fabric form, such as a woven fabric or a nonwoven fabric, if such fibers can be formed into a reinforcing-fiber base material F in sheet form. When a woven fabric is used, any of a plain weave, twill weave, or sateen weave construction may be used. In such a case, the state of the fibers is not particularly limited as long as the woven fabric is in sheet form and can be impregnated with the thermoplastic resin P between the rolls described below while the sheet is continuously transferred.

The reinforcing fibers are resin-reinforcing fibers for increasing the mechanical strength of the fiber-reinforced resin sheet, and examples thereof include fibers such as glass fibers, carbon fibers, natural fibers, aramid fibers, alumina fibers, boron fibers, steel fibers, PBO fibers, or high-strength polyethylene fibers.

Meanwhile, the thermoplastic resin pellet Pa is introduced into the resin supply portion 3, and the molten thermoplastic resin P in sheet form is discharged from the dies 3a and 3b. For such thermoplastic resin, a crystalline thermoplastic resin or an amorphous thermoplastic resin can be used, and for example, nylon resin, polycarbonate resin, polyamide resin, oleofin-based resin such as polypropylene resin, acrylic resin, ABS resin, or the like can be used. A thermoplastic resin having a higher melting point (i.e., a higher softening point) than these may also be used.

Then, the reinforcing-fiber base material F in sheet form and the molten thermoplastic resin P in sheet form are introduced into the gap between the pair of impregnating rolls 10A, 10B, and the reinforcing-fiber base material F is impregnated with the thermoplastic resin P while the pair of rolls 10A, 10B are rotated with a driving force of the motor 30, whereby a fiber-reinforced resin sheet is manufactured.

Specifically, one impregnating roll 10A is pressed against the other impregnating roll 10B. Accordingly, circumferential surfaces 10a, 10a of both the impregnating rolls 10A, 10B are deformed so that surface pressure acts between the circumferential surface 10a of the one impregnating roll 10A and the circumferential surface 10a of the other impregnating roll 10B (see FIG. 3B). In such a state, a heated medium M is supplied to the cylindrical space S1 by the heating portion 40 as shown in FIG. 4, whereby the pair of impregnating rolls 10A, 10B are heated.

The molten thermoplastic resin P is supplied along the circumferential surface of each impregnating roll 10A (10B). The supplied thermoplastic resin P is made to infiltrate into the resin holding layer 12 from the surface thereof, and then the thermoplastic resin P is held therein. The held thermoplastic resin P is heated (or the heat thereof is retained) so that the molten state is maintained. The held thermoplastic resin P is transferred toward the gap between the pair of rolls 10A, 10B with the rotation of the pair of impregnating rolls 10A, 10B, whereby the reinforcing-fiber base material F is impregnated with the thermoplastic resin P.

In this embodiment, the molten thermoplastic resin P is supplied to the pair of impregnating rolls 10A, 10B via the dies 3a, 3b so that a resin pool P1 of the molten thermoplastic resin P is generated above the pair of impregnating rolls 10A, 10B. The resin pool P1 can be generated by controlling the supply amount of the thermoplastic resin P supplied from each die 3a (3b) in consideration of the rotation speed of each impregnating roll 10A (10B), the viscosity of the thermoplastic resin P, and the like.

According to this embodiment, an impregnating roll with the resin holding layer 12 formed thereon is used for the surface of each of the pair of impregnating rolls 10A, 10B, whereby the molten thermoplastic resin P can be held in the resin holding layer 12. In addition, the resin holding layer 12 elastically deforms in the thickness direction thereof when the pair of impregnating rolls 10A, 10B are pressed against each other. Thus, when the pair of impregnating rolls 10A, 10B are pressed against each other, the thermoplastic resin P held in the resin holding layer 12 can be discharged to the gap between the pair of impregnating rolls 10A, 10B from the pressed portion of the resin holding layer 12.

In this embodiment, the resin holding layer 12 is provided on each of the impregnating rolls 10A, 10B. Accordingly, when the pair of impregnating rolls 10A, 10B are relatively pressed against each other, surface pressure can be made to act upon the thermoplastic resin P and the reinforcing-fiber base material F between the impregnating rolls. Further, the opposite circumferential surfaces 10a, 10a of the impregnating rolls 10A, 10B can be deformed into a planar form in a state in which the molten thermoplastic resin is discharged from the resin holding layer. As described above, uniform stress can be made to act upon opposite sides of the reinforcing-fiber base material F, and thus a uniform fiber-reinforced resin sheet S with uniform thickness can be obtained.

As described above, pressure that acts upon the reinforcing-fiber base material F and the thermoplastic resin P is the surface pressure, unlike the linear pressure that would act when a conventional single rigid roll is used. Accordingly, the reinforcing-fiber base material F can be impregnated with the thermoplastic resin P uniformly and stably, without excessive pressure acting upon the reinforcing-fiber base material F. Consequently, a fiber-reinforced resin sheet S with uniform thickness and without step-like streaks in the width direction can be obtained.

In addition, in this embodiment, surface pressure can be made to act upon the impregnating rolls 10A, 10B while they are rotated, and the thermoplastic resin P discharged from the resin holding layer 12 can be supplied to a portion of the reinforcing-fiber base material F upon which the surface pressure has acted. Accordingly, it is possible to secure a longer impregnation time than is conventional, and supply an optimal amount of thermoplastic resin to spaces between the fibers of the reinforcing-fiber base material F while favorably removing air existing between the fibers during impregnation.

In particular, in this embodiment, the resin pool P1 of the molten thermoplastic resin is formed above the pair of impregnating rolls 10A, 10B that are arranged side by side in the horizontal direction. Thus, the molten thermoplastic resin from the resin pool P1 can be stably supplied to the gap between the pair of impregnating rolls 10A, 10B.

Further, a portion of the resin holding layer 12, which has elastically deformed upon pressing of the impregnating rolls against each other (i.e., a contact portion between the impregnating rolls), restores its original state with the rotation of the impregnating rolls 10A, 10B. Accordingly, it is possible to supply the molten thermoplastic resin P to spaces (voids) in the restored resin holding layer 12, and allow the resin holding layer 12 to hold the thermoplastic resin P therein again. Accordingly, the reinforcing-fiber base material F in sheet form and the thermoplastic resin P can be introduced into the gap between the pair of impregnating rolls 10A, 10B, and thus, the reinforcing-fiber base material F can be continuously impregnated (supplied) with the molten thermoplastic resin P.

The thus obtained fiber-reinforced resin sheet S is passed using the transfer rolls, and is then wound up in coil form with the wind-up portion 5. Although the thermoplastic resin P is directly supplied to the circumferential surfaces 10a, 10a above the impregnation rolls 10A, 10B in this embodiment, it is also possible to supply the thermoplastic resin P from a circumferential surface above one of the impregnating rolls as long as the reinforcing-fiber base material F can be uniformly impregnated with the thermoplastic resin P.

Figure 6:
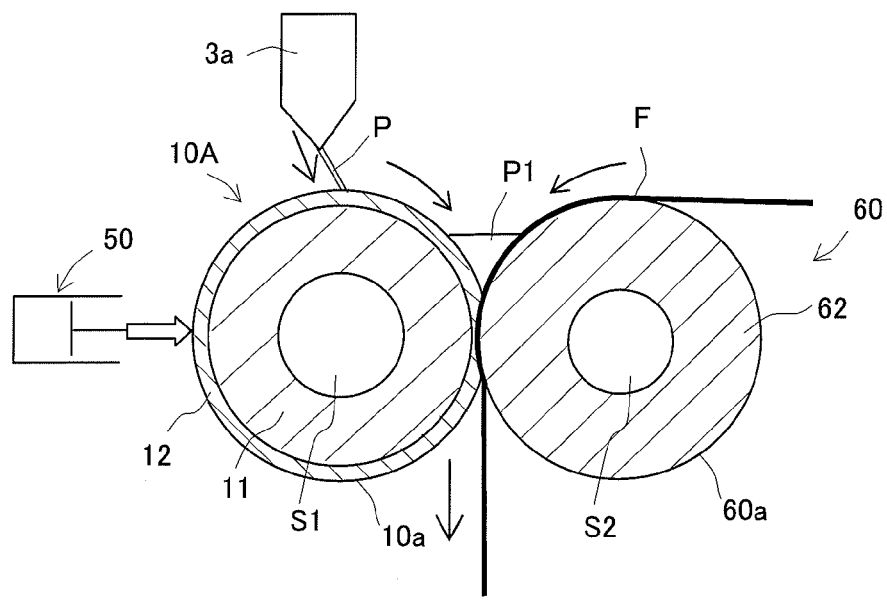
FIG. 6 is a schematic cross-sectional view showing a resin impregnating portion of the manufacturing device for a fiber-reinforced resin sheet in accordance with another variation of the embodiment shown in FIG. 1.

FIG. 6 is a schematic cross-sectional view showing a resin impregnating portion of the manufacturing device for a fiber-reinforced resin sheet in accordance with another variation of the embodiment shown in FIG. 1. The device of the embodiment shown in FIG. 6 differs from that shown in FIG. 1 in that a typical cylindrical metal roll is used instead of the impregnating roll 10B having the resin holding layer 12 formed thereon. The other configuration is the same as that in the aforementioned embodiment shown in FIG. 1. Thus, detailed description thereof will be omitted.

As shown in FIG. 6, in this embodiment, an impregnating roll 10A and a cylindrical metal roll 60 made of iron are provided. The metal roll 60 has a cylindrical space S2 formed therein, and the inner portion thereof is connected to a heating portion so as to circulate a medium heated with the heating portion as in the aforementioned embodiment. Accordingly, it is possible to wind up the reinforcing-fiber base material F around the metal roll 60 and preheat the introduced reinforcing-fiber base material F between the pair of rolls 10A, 60, and thus suppress an increase in viscosity of the thermoplastic resin P during impregnation. In addition, the metal roll 60 is connected to a motor as in the aforementioned embodiment.

When such a metal roll 60 is used, the surface of one impregnating roll 10A having the resin holding layer 12 formed thereon will deform along the shape of the surface of the other metal roll due to elastic deformation of the resin holding layer 12. Thus, surface pressure can be made to act upon the thermoplastic resin P and the reinforcing-fiber base material F between the rolls 10A, 60 in a state in which the molten thermoplastic resin P is discharged from the resin holding layer 12 to the gap between the pair of rolls 10A, 60.

Figure 7:
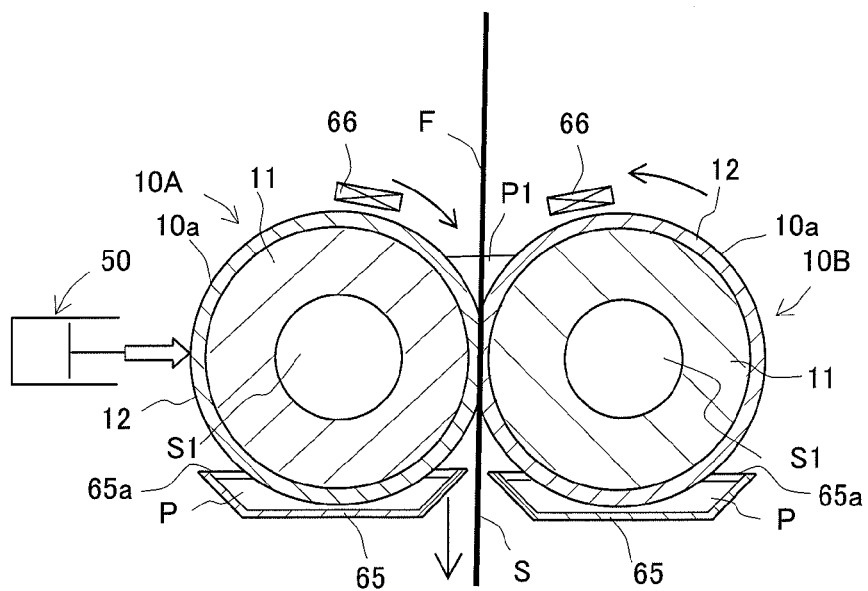
FIG. 7 is a schematic cross-sectional view showing a resin impregnating portion of the manufacturing device for a fiber-reinforced resin sheet in accordance with another variation of the embodiment shown in FIG. 1.

FIG. 7 is a schematic cross-sectional view showing a resin impregnating portion of the manufacturing device for a fiber-reinforced resin sheet in accordance with another variation of the embodiment shown in FIG. 1. The device of the embodiment shown in FIG. 7 differs from that shown in FIG. 1 in that containers 65, 65 that hold a molten thermoplastic resin are used instead of the dies 3A and 3b, and heaters 66, 66 for heating the resin holding layers 12 are provided above the respective impregnating rolls 10A, 10B. The other configurations are the same as those in the aforementioned embodiment. Thus, detailed description thereof will be omitted.

As shown in FIG. 7, in this embodiment, a container 65 that holds the molten thermoplastic resin P is provided below each impregnating roll 10A (10B). Each container 65 is supplied with the molten thermoplastic resin and is provided with a heater (not shown) for heating the held thermoplastic resin so that the temperature of the supplied thermoplastic resin P will become greater than or equal to the melting point thereof.

Further, the resin holding layer 12 of the impregnating roll 10A (10B) is impregnated with the molten thermoplastic resin P via an opening 65a of the container 65. In addition, as described above, heaters 66, 66 for heating the resin holding layers 12 are provided above the impregnating rolls 10A, 10B.

According to such a configuration, the molten thermoplastic resin P infiltrates into the resin holding layer 12 from the surface thereof in the container 65, and is held therein. After that, the held the thermoplastic resin P is transferred to the gap between the pair of impregnating rolls 10A, 10B with the rotation of the impregnating roll 10A (10B). At this time, the held thermoplastic resin P is heated by the heaters 66 immediately before it is introduced into the gap between the pair of impregnating rolls 10A, 10B. Thus, the thermoplastic resin P with lower viscosity can be supplied to the gap between the pair of impregnating rolls 10A, 10B.

EXAMPLES

Hereinafter, the present invention will be described with reference to examples.

Example 1

A reinforcing-fiber base material in sheet form, with a thickness of 0.05 mm and a width of 50 mm, was prepared that has been obtained by spreading carbon fiber bundles of 15000 continuous fibers with a diameter of 7 mm (the width of a single bundle is 6 to 7 mm). Next, a device with the same configuration as the device shown in FIG. 1 was used. Each impregnating roll is a roll obtained by winding a steel wire (i.e., a metal fiber material) in loop form having a wire diameter of 100 μm around a steel roll with a diameter of 200 mm so that a porosity (i.e., a volume fraction) of 50% is attained. It was confirmed that the thickness of the resin holding layer made of such a metal fiber material was 2 mm, and the resin holding layer would elastically deform in the thickness direction thereof upon pressing of the impregnating rolls against each other.

Polyamide 6 (which has a resin viscosity of 2000 poise at 270° C.) with a melting point (225° C.) that has been melted at 270° C. was supplied as the thermoplastic resin at a predetermined proportion from above the pair of impregnating rolls (0.5 g/seconds). At this time, the polyamide 6 infiltrated into the resin holding layers. In such a state, the impregnating rolls were heated to 230° C. by the heating portions and the pair of impregnating rolls were rotated (1.6 rpm) while being pressed against each other so that a surface pressure of 2 MPa would act upon the reinforcing-fiber base material and Polyamide 6, and the reinforcing-fiber base material was introduced into the gap between the rolls at 0.07 g/seconds. Accordingly, a resin pool of Polyamide 6 was formed above the pair of impregnating rolls, and a fiber-reinforced resin sheet obtained by impregnating the reinforcing-fiber base material with the molten thermoplastic resin was manufactured. It was confirmed that the reinforcing-fiber base material and Polyamide 6 were pressure-bonded to the surface of the resin holding layer of each impregnating roll.

Comparative Example

As in the example, a fiber-reinforced resin sheet was manufactured. The comparative example differs from the example in that steel rolls, each with a diameter of 200 mm, were used as the impregnating rolls. That is, the comparative example differs from the example only in that resin holding layers made of metal fiber materials are not provided.

[Observation of Cross-Sections]

Figure 8:
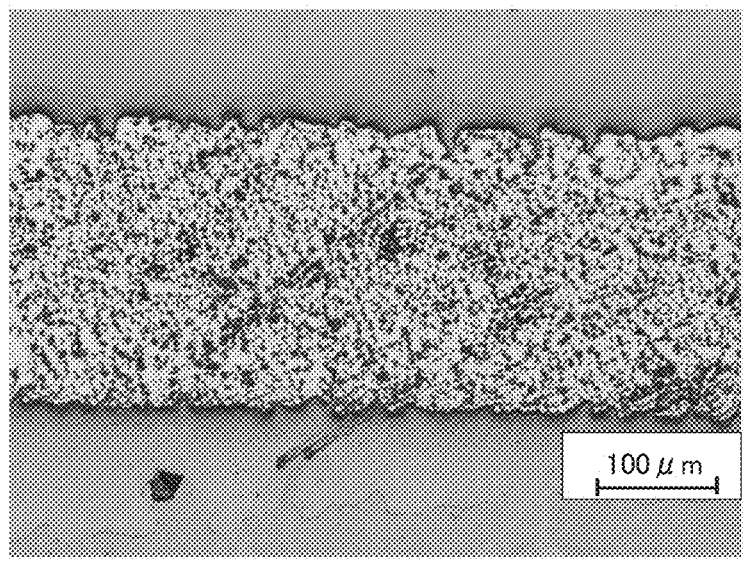
FIG. 8 are enlarged views of cross-section photographs of fiber-reinforced resin sheets in accordance with an example and a comparative example; specifically.
Figure 8:
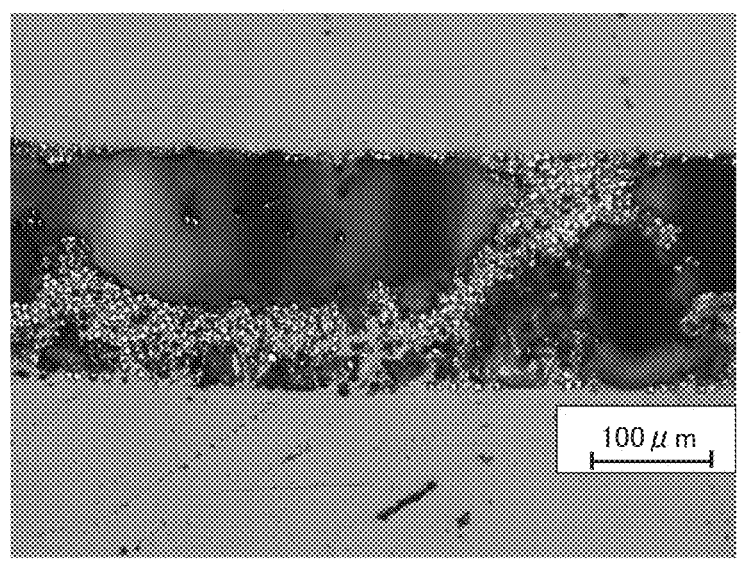

Cross sections of the fiber-reinforced resin sheets in accordance with the example and the comparative example were observed. FIG. 8 are enlarged views of cross-section photographs of the fiber-reinforced resin sheets in accordance with the example and the comparative example; specifically, FIG. 8A is an enlarged view of a cross-section photograph in accordance with the example, and FIG. 8B is an enlarged view of a resin photograph in accordance with the comparative example.

(Results and Observation)

As shown in FIGS. 8A and 8B, in the fiber-reinforced resin sheet in accordance with the example, spaces between fibers are impregnated with a thermoplastic resin more uniformly than in the comparative example. As shown in FIG. 8B, the fiber-reinforced resin sheet of Comparative Example 1 was found to have larger voids (i.e., black portions in the photograph) formed thereon than that of the example.

This is considered to be due to the fact that a resin holding layer was provided on the surface of each impregnating roll. That is, in the example, a thermoplastic resin held in the resin holding layer was discharged to the reinforcing-fiber base material between the pair of rolls from the pressed portion of the resin holding layer, and thus, it was possible to, in such a state, allow surface pressure to act upon the thermoplastic resin and the reinforcing-fiber base material between the rolls through elastic deformation of the resin holding layer.

Although the embodiments of the present invention have been described in detail above, the present invention is not limited thereto, and various design changes can be carried out without departing from the scope and spirit of the present invention described in the claims.

For example, the heaters shown in FIG. 7 may be further provided above the impregnating rolls shown in FIGS. 3 and 6.

REFERENCE SIGNS LIST

1 Manufacturing device for fiber-reinforced resin sheet
2 Reinforcing-fiber supply portion 2a Wound-up body
2b, 2c Transfer roll
3 Resin supply portion
3a, 3b Die (nozzle)
4 Resin impregnating portion
5 Wind-up portion
10A, 10B Impregnating roll
10a Circumferential surface
30 Motor
31 Coupling
40 Heating portion
50 Pressing portion
51 Piston
52 Cylinder
F Reinforcing-fiber base material
M Medium
P Thermoplastic resin
Pa Thermoplastic resin pellet
S Fiber-reinforced resin sheet
S1 Cylindrical space
S2 Cylindrical space

The invention claimed is:

1. A manufacturing method for a fiber-reinforced resin sheet, comprising:
   introducing a reinforcing-fiber base material in sheet form and a thermoplastic resin into a gap between a pair of impregnating rolls; and
   impregnating the reinforcing-fiber base material with the thermoplastic resin that is melted while rotating the pair of impregnating rolls, wherein
   a surface of at least one of the pair of impregnating rolls has a resin holding layer formed thereon, the resin holding layer being adapted to elastically deform in a thickness direction thereof when the pair of impregnating rolls are pressed against each other, and hold the molten thermoplastic resin therein so as to be able to discharge the molten thermoplastic resin upon pressing of the pair of impregnating rolls against each other,
   the resin holding layer consists of a metal fiber material or a metal foamed material, and
   upon pressing of the pair of impregnating rolls against each other while the molten thermoplastic resin is held inside the resin holding layer, the reinforcing-fiber base material is impregnated with the thermoplastic resin while at least the resin holding layer is elastically deformed.

2. The manufacturing method for a fiber-reinforced resin sheet according to claim 1, wherein the pair of impregnating rolls are arranged side by side in a horizontal direction, and the molten thermoplastic resin is supplied to the gap between the pair of impregnating rolls so that a resin pool of the molten thermoplastic resin is generated above the pair of impregnating rolls.

3. The manufacturing method for a fiber-reinforced resin sheet according to claim 1, wherein the resin holding layer is heated to a temperature that is greater than a melting point of the thermoplastic resin.

* * * * *